(12) United States Patent
Peyron

(10) Patent No.: US 6,253,814 B1
(45) Date of Patent: Jul. 3, 2001

(54) TIRE HAVING AN AIRTIGHT LAYER WITH A DUCTILE METAL LAYER

(75) Inventor: Georges Peyron, Riom (FR)

(73) Assignee: Compagnie Generale des Etablissements Michelin - Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/361,896

(22) Filed: Jul. 27, 1999

Related U.S. Application Data

(63) Continuation of application No. PCT/EP98/00078, filed on Jan. 8, 1998.

(30) Foreign Application Priority Data

Jan. 30, 1997 (FR) .................................................. 97 01257

(51) Int. Cl.[7] .............................. B60C 1/00; B60C 5/12; B60C 5/14
(52) U.S. Cl. .................. 152/510; 152/450; 152/DIG. 16
(58) Field of Search ................................... 152/510, 564, 152/548, 512, 450, DIG. 16; 428/35.3, 35.8, 35.9

(56) References Cited

U.S. PATENT DOCUMENTS

| 3,106,210 | 10/1963 | Reynolds et al. . |
| 3,586,005 | 6/1971 | Lippman, Jr. et al. . |

FOREIGN PATENT DOCUMENTS

| 0557091 | 8/1993 | (EP) . |
| 0760297 | 3/1997 | (EP) . |
| 769286 | 3/1957 | (GB) . |

OTHER PUBLICATIONS

Patent Abstracts of Japan, Publication No. 56138005, Application No. 55041848, Bridgestone Corp., Decorated Tire, Oct. 28, 1981, Abstract.

*Primary Examiner*—Adrienne C. Johnstone
(74) *Attorney, Agent, or Firm*—Baker Botts L.L.P.

(57) ABSTRACT

A tire has a toroidal-shaped carcass and an airtight layer which contains at least one ductile metal layer. In one embodiment the airtight layer is a deformable metal layer having a thickness less than or equal to 5 μm applied on the interior surface of the tire carcass by a support carrier on which the metal layer has been deposited. The support carrier may be retained as part of the tire or removed after applying the metal layer on the interior surface of the tire carcass.

17 Claims, 2 Drawing Sheets

TIRE HAVING AN AIRTIGHT LAYER WITH A DUCTILE METAL LAYER

This application is a continuation of PCT/EP98/00078, filed Jan. 8, 1998 now WO 98/33668.

BACKGROUND OF INVENTION

This invention relates to a tire having an airtight layer with a ductile layer.

Tubeless tires have an interior surface of low air permeability in order to avoid deflation of the tire and to protect the sensitive internal areas of the latter against intake of oxygen and water, such as the plies containing wire cords sensitive to oxidation. Today such protection of the interior surface of tires is provided by coatings made of butyl rubber.

Since fuel economy and the need to protect the environment have become a priority, it is desirable to produce airtight coatings with a weight and a hysteresis as low as possible. Performances in terms of airtightness of butyl rubber are linked to a not negligible minimum thickness of rubber (in the order of one millimeter) and therefore to a certain weight, which makes it impossible to respond to these new requirements efficiently.

In order to accomplish such objective of weight reduction of the coating, while maintaining good airtightness properties, numerous solutions have been proposed. The very great majority of those solutions have concentrated essentially on the use of materials of very low air permeability other than butyl rubber. In particular, the use of lamellar composite structures has been proposed, consisting of one or more layers of barrier material, to which is added or not an adhesive layer ensuring maintenance on the compound to be coated.

By way of illustrative examples of this prior art, U.S. Pat Nos. 4,874,670 and 5,036,113, describe the development of an elastomer inner liner consisting of a photoreticulated polymer film maintained in the internal compound of the casing by means of an adhesive (formophenol resin or alcohol acrylate with polymerized long chain). In spite of a reduced thickness and air permeability relative to the butyl rubber-base inner liner, this film has a mediocre adherence temperature resistance as well as overly high vitreous transition temperature values (Tg) for use as a tire casing inner liner.

Furthermore, the oxygen permeability of polyurethanes increases in the presence of water, which is unfavorable for the role of protection by the inner liner of the internal plies against corrosion of the cords, as well as for the maintenance of inflation pressure. The same problem appears in U.S. Pat. No. 5,264,524, where the barrier coating consists of an acrylonitrile/butadiene/polyurea copolymer.

Other solutions have also been proposed, such as presented in U.S. Pat. No. 5,236,030, which describes the lining of a tire casing consisting of a thin polyethylene film of ultrahigh molecular weight (UHMWPE), the airtightness and lightness of which are augmented in relation to a butyl rubber inner liner, without requiring the use of an adhesive layer, although no proof of adhesive sufficiency of the UHMWPE layer is presented. This layer is placed directly inside the tire casing, which probably results, upon forming in the tire casing and upon vulcanization, in an alteration of crystallinity of the film, which is a parameter essential for low air permeability.

In the variant applications presented in patents JP 4062009 and JP 4212602, the UHMWPE film in emulsified powder form is sprayed or brushed on the internal compound of the crude tire formed, then dried and vulcanized. Such a method necessitates perfect mastery of the drying phase and entails an operating time incompatible with an industrial application.

Another solution, such as patent WO 92/20538 describing the use of a reticular chlorinated polyethylene elastomer (CPE), whose oxygen permeability, weight and cost are reduced in relation to a butyl rubber inner liner, does not seem any more satisfactory, the airtightness function not being accomplished efficiently enough.

It is to be feared, moreover, that the thermoplastic character of most of the materials used is incompatible with the mechanical stresses to which the interior surfaces are subjected on different phases of assembly and vulcanization and on the rolling of said tires.

SUMMARY OF THE INVENTION

The invention is aimed at providing a new coating intended for airtight tires and overcoming such difficulties.

It has been discovered surprisingly that the metallized plastic films whose barrier properties are well known for the manufacture of packaging, notably, to preserve foods and protect them from oxidation, could be transposed to tires with certain adaptations. This application seems all the more amazing considering that the expert is aware of the incompatibilities of such films with elastomers at the same time, from the standpoint of producing a good bond between those materials, indispensable for an application to tires, and the insufficient elasticity of such films to accompany the deformations undergone by their support in applications to tires.

Thus, the invention concerns a toroidal-shaped tire containing an airtight layer, characterized in that the airtight layer contains at least one ductile metal layer.

In fact, the presence of a metal layer makes it possible to ensure wholly satisfactory airtightness, compatible with tire requirements. Furthermore, the ductility of the metal layer enables the airtight layer to accompany the deformations sustained by the tire carcass in the course of assembly, curing and rolling.

The airtight layer can be placed on either side of the tire carcass ply, but it can also be a standard airtight coating placed on the interior surface of the tire.

According to another characteristic, the thickness of the metal layer is less than or equal to 5 $\mu$m (micrometers) and preferably ranges between 30 and 200 nm (nanometers). This fineness thus makes it possible, on the one hand, thanks to the ductility of the metal, to accompany strong deformations of the tire and, on the other, to reduce the weight of the airtight layer considerably, while preserving the same airtightness capacity, if not improving it.

The metal layer consists preferably of aluminum. In fact, aluminum can be easily used to make metallized films by vacuum deposition.

According to a variant embodiment of the invention, the airtight layer comprises at least one protective layer covering the metal layer and facilitating handling of the metal layer for use of the coating in manufacture of the tire.

Said protective layer can be removed or retained once the tire is finished, in which case it consists advantageously of an extendible polymer in order to follow the deformations sustained by the tire and to help the metal layer follow them.

DESCRIPTION OF THE DRAWINGS

Other characteristics and advantages of the invention will appear on reading the description of a working example of a tire according to the invention, with reference to the drawings in which.

DESCRIPTION OF PREFERRED EMBODIMENTS

The elements common to the variants of the invention represented in the different figures will be indicated below with the same references.

Figure 1:
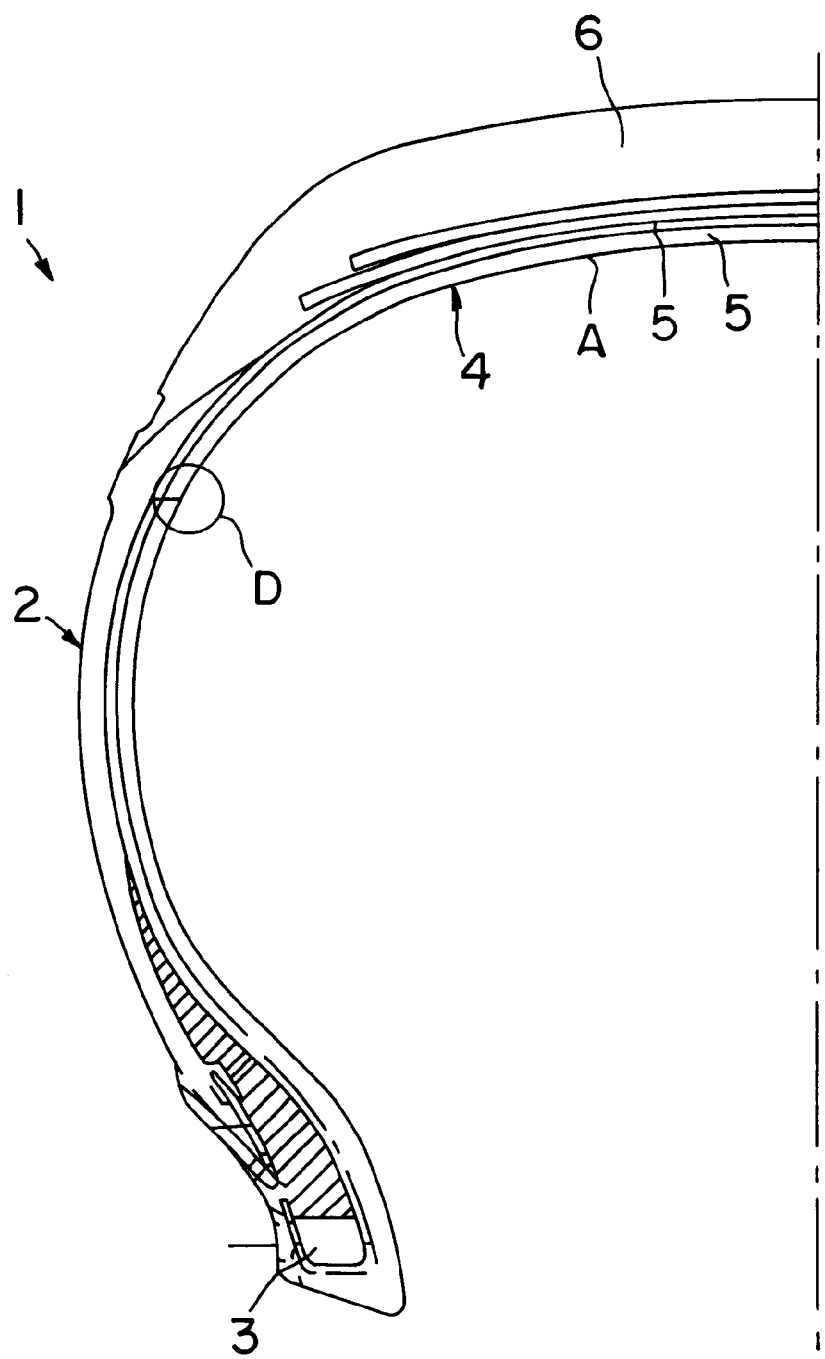
FIG. 1 is a partial schematic section of the tire.

According to FIG. 1, the tire of the invention contains a doughnut-shaped carcass 2, bead wires 3 and a tread 6 situated at the crown of the carcass 2.

The carcass 2 comprises, in known manner, a coating 4 constituting the interior surface of the tire 1 as well as one or more plies, called "carcass plies" 5, anchored around the bead wires 3.

The coating 4 consists of a ductile metal layer A in contact with the tire.

The use of a metal layer poses major problems. When subjected to deformations, there is no resilience for the metal layer, and a rupture or appearance of microcorrugations which score the surface therefore occurs, changing the look and the source of residual local stresses unfavorable to good resistance to dynamic stresses. That is, notably, the reason why use of such a metal layer would ordinarily be ruled out by the expert. However, it has surprisingly been discovered that the choice of a ductile metal enabled this metal, to sustain a creep without appreciable cracking and that it was therefore possible to use such a metal layer in the tire.

Furthermore, for this same purpose, a thickness of metal layer as small as possible is chosen; thus, a thickness not exceeding 5 μm is selected. This makes it possible effectively to follow the deformations of the rubber, without resulting in tearing of the metal layer, and to bring about a weight advantage. A thickness close to 30 nm is preferably chosen, which corresponds to a minimum permeability of a metal layer in that range of thickness.

Different ductile materials can be chosen among the common metals with centered cubical or centered face cubical crystalline structure, such as zinc and cadmium. Aluminum in pure form seems to be of particular interest, especially because of its easy use in making metallized films.

Figure 5:
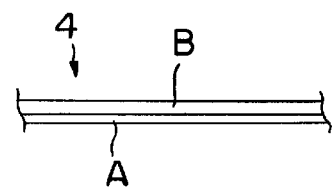
FIG. 5 is a partial schematic representation of the coating according to a first embodiment.

However, it is clear that the handling of a very fine metal layer A is almost impossible. This is why it is necessary to arrange for the coating 4 to include a protective layer B covering the metal layer A, as shown in FIG. 5.

The protective layer B can be exclusively used as support in order to increase the cohesion of the coating 4 and it can be removed from the tire:

either before placement of the coating 4, if it was affixed to the surface of the metal layer A intended to be assembled to the latter, the other face of the metal layer being supported, or after placement of the coating 4, if the protective layer B was bonded to the other face of the metal layer A.

Such a coating 4 can be made by different methods; for example, a not very adherent metallized layer can be made on a nonporous support (polyethylene, polypropylene, etc.) by vacuum deposition of the metal on the support, which is transferred on one of the constituents of the tire, such as one of the carcass plies 5, the support then being removed.

Figure 2:
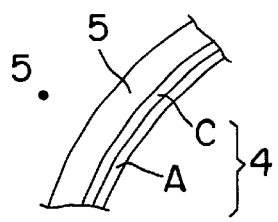
FIG. 2 is an enlargement of detail D of FIG. 1 according to a first variant embodiment of the invention.
Figure 3:
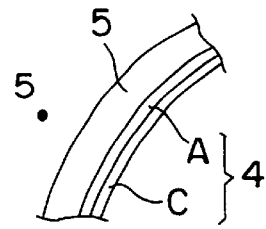
FIG. 3 is an enlargement of detail D of FIG. 1 according to a second variant embodiment of the invention.

The variant embodiments of the invention represented in FIGS. 2 and 3 take into account the fact that the coating 4 comprises a protective layer C, as previously, but that this layer remains in the tire. This protective layer C is formed by an extendible polymer in order to be able to sustain the deformations of the tire.

The presence of this protective layer C is important, even if the weight gain is somewhat less than with the metal layer A alone. In fact, in addition to facilitating handling of the coating 4, it makes it possible to have the metal layer A follow the deformations more easily, and even to improve airtightness. The relative thicknesses of those two layers can then be acted upon to achieve the desired characteristics better.

This protective layer C can be situated toward the inside or outside of the tire, that is, the metal layer A is in contact with the inside of the tire and the protective layer C is in contact with the air, as shown in FIG. 3, or toward the inside of the tire, that is, between the latter and the metal layer A, as shown in FIG. 2.

The extendible polymer entering into the composition of this extendible polymer layer C consists of a natural rubber, a cross-linkable or thermoplastic synthetic rubber or a deformable plastic of low rigidity. A deformable plastic of low rigidity means a plastic that can sustain a deformation comparable to that of the standard butyl rubber used. It is therefore necessary for the respective products of the modulus by thickness of plastic and butyl rubber to be comparable. A deformable plastic will be considered as being of low rigidity if the product of its modulus by thickness is less than or equal to 3,000 N/m and preferably less than or equal to 1,000 N/m, the thickness considered being the thickness of layer C.

As examples of cross-linkable synthetic rubber, one can mention: a polybutadiene, a styrene-butadiene copolymer, an EPDM, butyl rubber and acrylic or methacrylic polymers and, as examples of thermoplastic synthetic rubber: an ethylene-propylene copolymer and a polyurethane, and as deformable plastic of low rigidity: a polypropylene or a polyethylene.

The coating 4 comprising layers A and C can be formed notably:

by spraying or gluing of the extendible polymer on the metal layer deposited on a protective layer B or on the tire, or by transfer of a not very adherent metallized layer on a nonporous support (polyethylene, polypropylene, polyester, polyamide, etc.) on an extendible polymer layer, or by coating on a strippable support (paper, plaster, etc.) or water-soluble (polyvinyl alcohol, polyvinylpyrrolidone) with an extendible polymer, and then metallization of the polymer layer. When the support is removed, a metallized polymer film remains.

Figure 7:
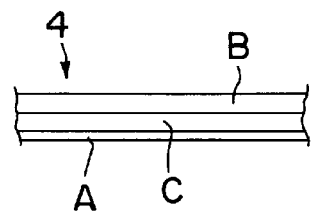
FIG. 7 is a partial schematic representation of the coating according to a third embodiment.

In a third variant embodiment of the invention represented in FIG. 7, the coating 4 contains two protective layers B and C, protective layer C being placed between metal layer A and protective layer B. Protective layers B and C can be different or identical.

Figure 4:
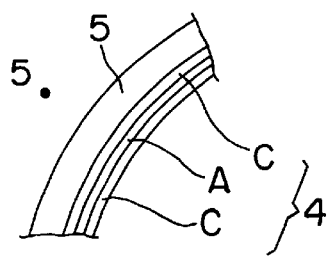
FIG. 4 is an enlargement of detail D of FIG. 1 according to a third variant embodiment of the invention.
Figure 6:
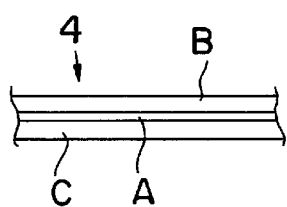
FIG. 6 is a partial schematic representation of the coating according to a second embodiment.

According to another variant embodiment of the invention, the coating 4 contains two protective layers, the metal layer being placed between those two protective layers. These two protective layers can also consist of two layers C, as represented in FIG. 4, or a layer B and a layer C, as represented in FIG. 6.

These different combinations as well as the other possible combinations (notably, those containing more layers) make it possible to optimize the desired characteristics of the coating, and in general of the tire, and/or to facilitate manufacture of the tire.

One can thus envisage using this new coating by integrating its assembly stage in the standard process of assembly of the tire in place of the assembly of butyl rubber before or after forming, the coating 4 being capable of undergoing the different deformations due to assembly or curing. It is also possible, although this solution is less important industrially, to assemble that coating 4 with the tire only after curing, in order to limit the deformations to be sustained by the latter.

To accomplish assembly of the coating 4, commercial glues can be used, making it possible to form metal-rubber bonds by choosing those which also withstand certain stresses and/or temperature rise; for example, in the case of an aluminum metal layer A, the CHEMOSIL 220 marketed by the HENKEL company may be used as adhesive.

Other processes can, of course, be envisaged, which do not require the presence of a bonding glue.

The following examples make it possible to illustrate the invention, without, however, limiting it.

EXAMPLE 1

This example is aimed at underscoring the gain in airtightness achieved by a metallized film over a standard butyl rubber used as interior surface of the tire, and at demonstrating that this airtightness is linked to the presence of the metal.

For such purpose, the air permeabilities at 80° C. of the following four samples were compared:

The "BUTYL" sample which comprises a butyl rubber layer 0.6 mm (millimeter) thick, made in a single stage of formulation (the parts being expressed by weight):

| Butyl elastomer: | 100 | Stearic acid: | 2 |
| N772 black: | 62 | Sulfur: | 1 |
| Aromatic oil: | 10 | MBTS*: | 1 |
| Zinc oxide: | 3 | | |

*MBTS = benzothiazyl disulfide

The "CLARYL" sample comprising a natural rubber base permeable support 0.6 mm thick, on which was glued a CLARYL 34.10 film marketed by the RHONE-POULENC company, consisting of a PET (polyethylene terephthalate) polyester layer 12 $\mu$m thick, covered on one face by approximately 30 nm of aluminum.

Gluing is carried out with the CHEMOSIL.220 marketed by the HENKEL company, which comes in the form of a solution and is known in the literature for gluing of common metals (steel, aluminum, etc.) on rubber compounds. The operating method followed consists of depositing a layer of CHEMOSIL.220 with a spray gun on the aluminum face of the CLARYL film, drying for 45 min. (minutes) at room temperature (or 10 min. at 80° C.), then depositing a 10% solution layer of the natural rubber compound used for the support and thus gluing the CLARYL film on said support.

The "PET" sample comprises a PET layer identical to that used in the 12 $\mu$m thick CLARYL film deposited on a support identical to that of the 0.6 mm thick CLARYL sample.

Vulcanization is carried out for all samples at 150° C. for 40 min.

Permeability is measured according to standard NFT46037.

The results obtained are set forth in the following Table I.

TABLE I

| Samples | BUTYL | CLARYL | PET |
|---|---|---|---|
| Permeability at 80 ° C. ($10^{-18}$ m$^4$/N.s) | $5.40 \cdot 10^{-17}$ | not measurable | $3.75 \cdot 10^{-18}$ |

It is found that the permeability of the CLARYL sample is too low to be measured and, therefore, much lower than that of the BUTYL sample.

Furthermore, comparison of the permeability of the PET and CLARYL samples makes it possible to confirm that the very low air permeability of the CLARYL film is due essentially to the aluminum. This makes it possible to demonstrate the importance of use of a metal film such as aluminum to obtain a very low air permeability.

The BUTYL and CLARYL samples were subjected, furthermore, to 200 traction cycles with 10% elongation followed by bendings. After these fatigue tests, none of the samples shows deterioration, and the permeability measurement results are identical to the results previously obtained. This demonstrates the tightness fatigue strength of the coating containing a metal layer.

EXAMPLE 2

This example is intended to demonstrate the weight and permeability gains achieved with the use of a metallized film. In this example, three tires having the same components apart from the coating of their interior surface were made:

Tire 1 is a passenger car tire of 175/70 R14 dimensions of the MXT line marketed by the MICHELIN company, the lining of which consists of a butyl rubber, Tire 2 is identical to tire 1, except for the butyl rubber lining, which was removed, Tire 3 is identical to tire 1, except for the butyl rubber lining which was replaced by a CLARYL 34.10 film. Gluing of the CLARYL film was carried out in the same way as in Example 1 after forming of the tire, but before its curing. In fact, the PET of the CLARYL film does not conform to the criterion of deformable plastic of low rigidity. It could therefore not withstand the deformations of the tire due to forming; gluing of the CLARYL film must therefore be carried out after the latter.

These three tires were weighed before mounting them on the rim. Then, once mounted, these tires were inflated to the same pressure of 2.3 bars. The pressure of these three tires was measured again after having left them for 28 days at a temperature of 55° C. The weight and pressure loss results obtained are set forth in the following Table II:

TABLE II

| Tires | 1 | 2 | 3 |
|---|---|---|---|
| Weight (g) | 7740 | 7180 | 7235 |
| Pressure loss at 28 days (bars) | 0.3 | 0.55 | 0.15 |
| % pressure loss | 13.04 | 23.91 | 6.52 |

It is found that tires 2 (without lining) and 3 (CLARYL) present a not negligible weight gain over tire 1 (butyl rubber). On the other hand, it is found that the pressure losses with tire 2 (without lining) are very great and that only tire 3 (CLARYL) makes possible a marked reduction of pressure losses by comparison with tire 1 (butyl rubber).

This example confirms the dual interest of use of a metal film in an interior surface of the tire in order to achieve a weight gain and an improvement of airtightness over butyl rubber.

I claim:

1. A toroidal-shaped tire having an airtight layer, characterized in that said airtight layer contains at least one ductile metal layer.

2. A tire according to claim 1, in which said airtight layer is an airtight coating placed on the interior surface of said tire.

3. A tire according to claim 1, in which the thickness of the metal layer is less than or equal to 5 $\mu$m.

4. A tire according to claim 3, in which the thickness of the metal layer ranges between 30 and 200 nm.

5. A tire according to claim 1, in which the airtight layer includes at least one protective layer covering the metal layer.

6. A tire according to claim 5, in which said at least one protective layers consists of an extendible polymer.

7. A tire according to claim 6, in which the extendible polymer is chosen among the group consisting of natural rubber, synthetic rubber and a deformable plastic of low rigidity.

8. A tire according to claim 1, in which the airtight layer includes protective layers, different or identical, between which the metal layer is placed.

9. A tire according to claim 8, in which at least one of the protective layers consists of an extendible polymer.

10. A tire according to claim 9, in which the extendible polymer is chosen among the group consisting of natural rubber, synthetic rubber and a deformable plastic of low rigidity.

11. A tire according to claim 1, in which the airtight layer includes two protective layers, different or identical, one of the protective layers consisting of an extendible polymer placed between the metal layer and the other protective layer.

12. A tire according to claim 11, in which the extendible polymer is chosen among the group consisting of natural rubber, synthetic rubber and a deformable plastic of low rigidity.

13. A tire according to claim 1, in which the ductile metal layer is made of aluminum.

14. A tire having a toroidal-shaped carcass and comprising a deformable air-impermeable metal layer having a thickness less than 5 $\mu$m applied on the interior surface of the tire carcass by a support carrier on which the metal layer has been deposited, the support carrier being retained on the tire or removed, the metal layer providing a light-weight layer to improve the airtightness of the tire.

15. A tire as set forth in claim 14 in which the thickness of the metal layer is within the range of between of 30 and 200 nm.

16. A tire as set forth in claim 14 in which the support carrier is a non-porous film of an extendable polymer of low rigidity.

17. A tire as set forth in claim 14 including a protective layer over the metal layer, the metal layer being interposed between the support carrier and the protective layer.

\* \* \* \* \*